(12) United States Patent  
Lisenker et al.

(10) Patent No.: US 6,454,060 B1  
(45) Date of Patent: Sep. 24, 2002

(54) VEHICLE SUSPENSION MONOTUBE STRUT BASE CUP ASSEMBLY

(75) Inventors: ILya Lisenker, Miamisburg; Patrick N. Hopkins, West Carrollton, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/813,704

(22) Filed: Mar. 21, 2001

(51) Int. Cl.[7] .................................................. F16F 9/53
(52) U.S. Cl. ................ 188/267.1; 188/267; 188/282.2; 188/266.2; 188/267.2
(58) Field of Search .............................. 188/282.2, 267, 188/267.1, 267.2, 266.1, 266.2, 266.7, 266.8, 276, 266.6, 266.5

(56) References Cited

U.S. PATENT DOCUMENTS

| 4,620,620 A | * | 11/1986 | Johnston et al. ............ 188/319 |
| 4,770,438 A | * | 9/1988 | Sugasawa et al. ........... 280/707 |
| 5,125,681 A | * | 6/1992 | Brackette, Jr. ............... 280/707 |
| 5,207,774 A | * | 5/1993 | Wolfe et al. ........... 137/625.32 |
| 5,396,973 A | * | 3/1995 | Schwemmer et al. ........ 188/299 |
| 5,398,917 A | * | 3/1995 | Carlson et al. ......... 267/140.14 |
| 5,538,115 A | * | 7/1996 | Koch .......................... 188/299 |
| 6,007,345 A | * | 12/1999 | Francis et al. ................. 439/34 |
| 6,053,488 A | * | 4/2000 | Forsbach et al. ............ 267/221 |

* cited by examiner

Primary Examiner—Paul N. Dickson  
Assistant Examiner—Deron Kramer  
(74) Attorney, Agent, or Firm—Scott A. McBain

(57) ABSTRACT

A vehicle suspension damper assembly is provided which includes a cup member with a threaded opening formed therein. A piston rod includes a threaded portion, which is engaged in the threaded opening. An electrical connector including a terminal portion is received in an opening formed in the piston rod. The threaded engagement between the piston rod and the cup member is a predetermined length that reduces deflection of the cup member to reduce transfer of load to the terminal portion of the electrical connector.

17 Claims, 5 Drawing Sheets

VEHICLE SUSPENSION MONOTUBE STRUT BASE CUP ASSEMBLY

TECHNICAL FIELD

In general, the invention relates to damper assemblies for use in vehicle suspension systems, and more particularly, to a monotube strut and base cup assembly.

BACKGROUND OF THE INVENTION

Current vehicle suspensions frequently incorporate strut assemblies as both a damping device and, in some applications, part of the suspension's load bearing structure. Monotube struts or dampers are conventionally known which include a piston with a connected piston rod. The piston is slidably contained in a fluid filled tube or chamber.

Typically, in prior designs, an end of the piston rod opposite the piston is held in a hole formed through a base cup of the strut by a threaded nut on a side of the cup outside the fluid chamber. Typically, an opposing nut is fastened to the piston rod on an opposite side of the base cup in order to provide an anti-rotation feature for the piston rod that allows the connection to be tightened. This conventional design requires a relatively thin base cup in order to minimize dead length for the design. However, a thin cup increases the chances of fatigue failure of the cup by permitting the cup and associated members to deflect in response to loads from the strut.

Controlled dampers require an electrical connection to be made with the piston rod. Typically, the connector includes a terminal portion inserted into the piston rod and a ground portion in contact with the strut. The piston rod can be provided with sensors that sense the relative position between the sprung and unsprung masses (body and wheel assembly) of a vehicle. Another example discloses electrical components extending into the rod to control the magnetic flux in the damper to effect changes in a MR fluid and thus, effects damping characteristics of the damper unit. These electrically controlled dampers had been provided with an electrical connection to the rod, introducing a potential electrical failure point between the electrical connector and the nut. The electrical connector cannot be made integral with the nut because the connector needs to be oriented whereas the nut can tighten at any angular position. Finally, the prior art dampers have retained the connector within the cup assembly and a cap has been press fit to the cup for that purpose. However, the cap can be dislodged when the relatively thin base cup deflects under heavy damping loads.

It is an object of the present invention to provide a strut assembly that overcomes these disadvantages.

SUMMARY OF THE INVENTION

One aspect of the present invention provides a vehicle suspension damper assembly configured to be arranged between a wheel assembly and a body of a vehicle the vehicle suspension damper assembly including a cup member with a threaded opening formed therein. A piston rod is provided, which includes a threaded portion, the threaded portion of the piston engaged in the threaded opening of the cup. An electrical connector is provided that includes a terminal portion received in an opening formed in the piston rod. The threaded engagement between the cup member and piston rod is a predetermined length that reduces deflection of the cup member to reduce transfer of load to the terminal portion of the electrical connector.

Other aspects of the present invention provide a cup member, which includes a first portion adapted to be fitted to a reservoir tube. The threaded opening of the cup member can be formed in the first portion. The cup member can include a second portion having a first seat formed therein for receiving the electrical connector. The cup member can include a slot formed in the second portion to allow the electrical connector to extend therethrough. A socket portion of the electrical connector can extend through the slot in the second portion of the cup member. The cup member can include a second seat adjacent the first seat for receiving a cap, and wherein the cap when fitted to the second seat, retains the electrical connector to the cup member.

The assembly can further include an electrical connector including a concave portion. The cap can include a convex portion, the concave portion being in contact with the convex portion of the electrical connector when the electrical connector and cap are assembled to the cup member. A ground terminal of the electrical connector can be provided to contact the cup member.

A ring member can be provided, the ring member being disposed between the piston rod and cup member. The ring member can contact a shoulder formed about the piston rod and a groove formed in the cup member.

The piston rod includes a bore extending in the axial direction. The rod can include a first countersunk portion of the axial bore for receiving the terminal portion of the electrical connector. The rod can include a second countersunk portion relatively distally formed with respect to the first countersunk portion, the second countersunk portion including a driving feature.

Another aspect of the present invention provides a method of assembling a vehicle suspension damper assembly. The method includes fitting a cup member into a reservoir tube of the damper, threading a piston rod into the cup member a predetermined distance, positioning an electrical connector into the cup member, forming an electrical connection between the electrical connector and a component within the piston rod and securing a cap in the cup member to encapsulate the electrical connector in the cup member. The method can further include threading the piston rod into the cup member includes engaging a driving feature of the piston rod with a driving device and rotating the piston rod. The method can further include contacting a stop feature of the piston rod to the cup member.

Another aspect of the present invention provides a vehicle suspension damper assembly including a means for fitting a cup member into a reservoir tube of the damper, means for threading a piston rod into the cup member a predetermined distance, means for positioning an electrical connector into the cup member, means for forming an electrical connection between the electrical connector and a component within the piston rod and means for securing the electrical connector in the cup member. The vehicle suspension damper assembly can further include means to stop the threading of the piston rod into the cup member.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENTS

Figure 1:
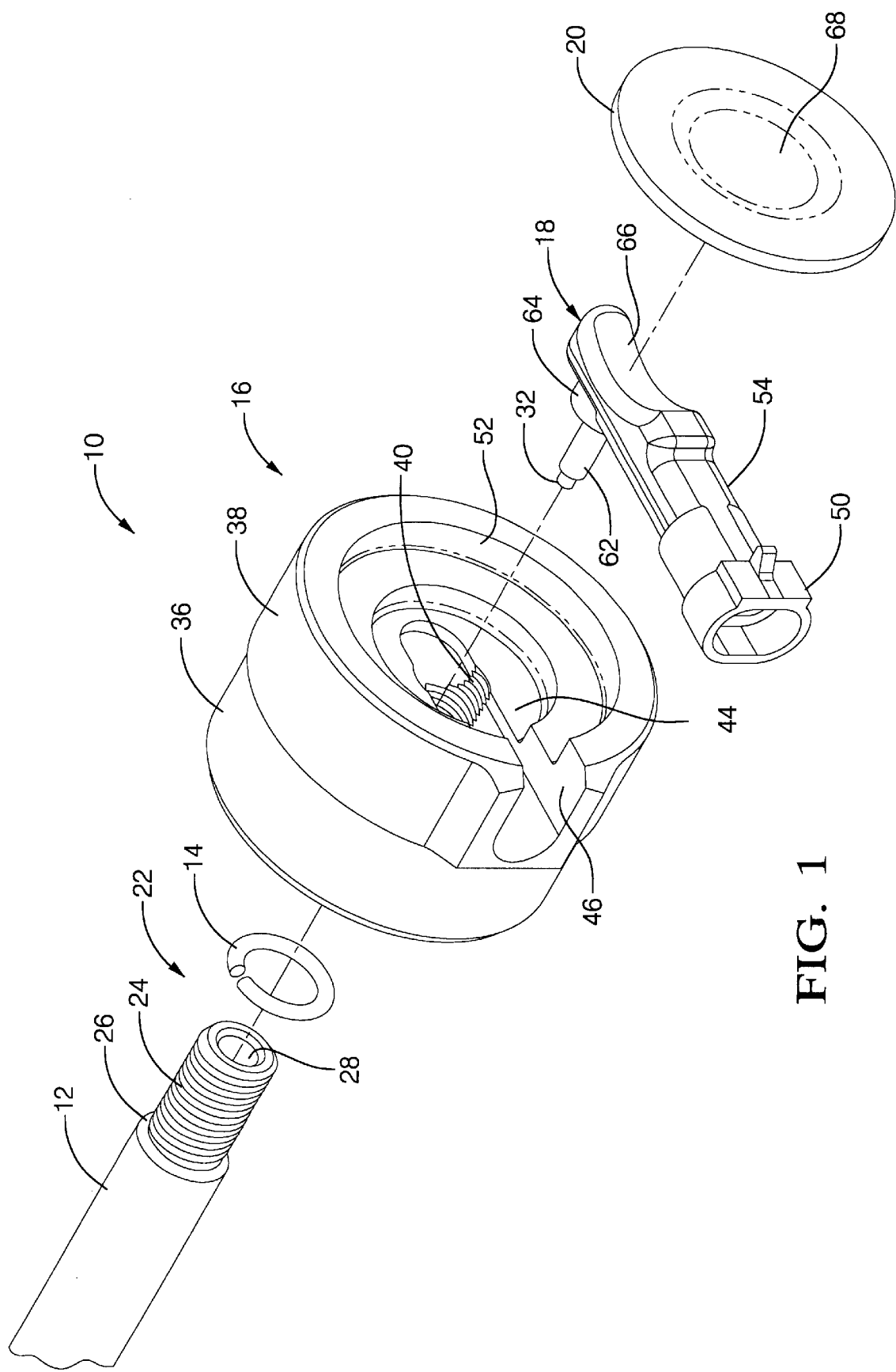
FIG. 1 is an exploded perspective view of one embodiment of the damper base cup and rod assembly of the present invention.
Figure 2:
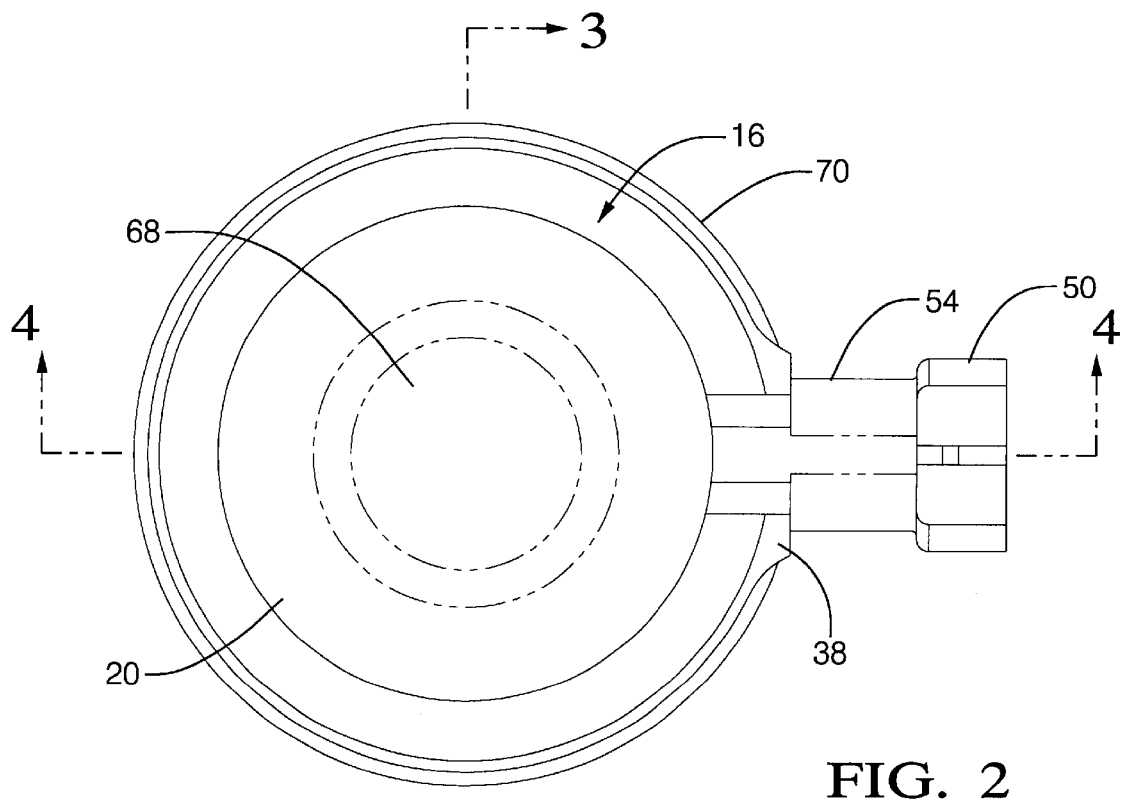
FIG. 2 is a top view of the embodiment shown in FIG. 1.
Figure 3:
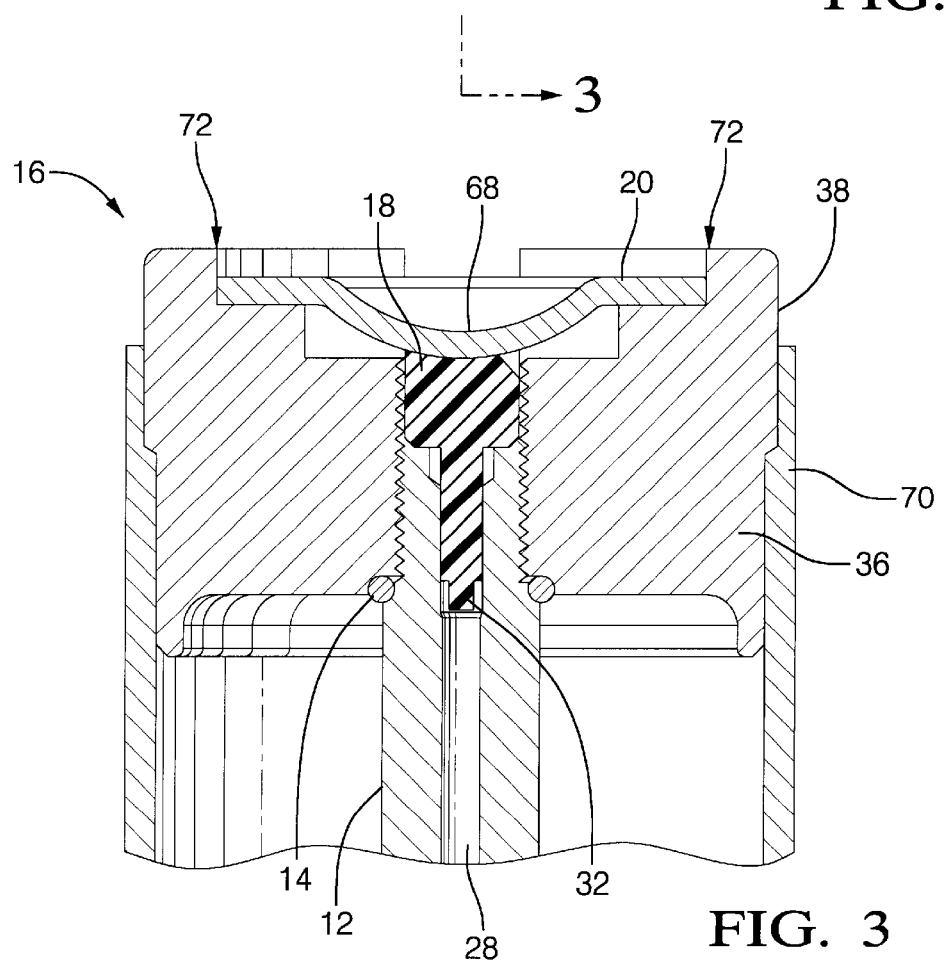
FIG. 3 is a cross-sectional view of the embodiment shown in FIG. 2 along lines 3—3.
Figure 4:
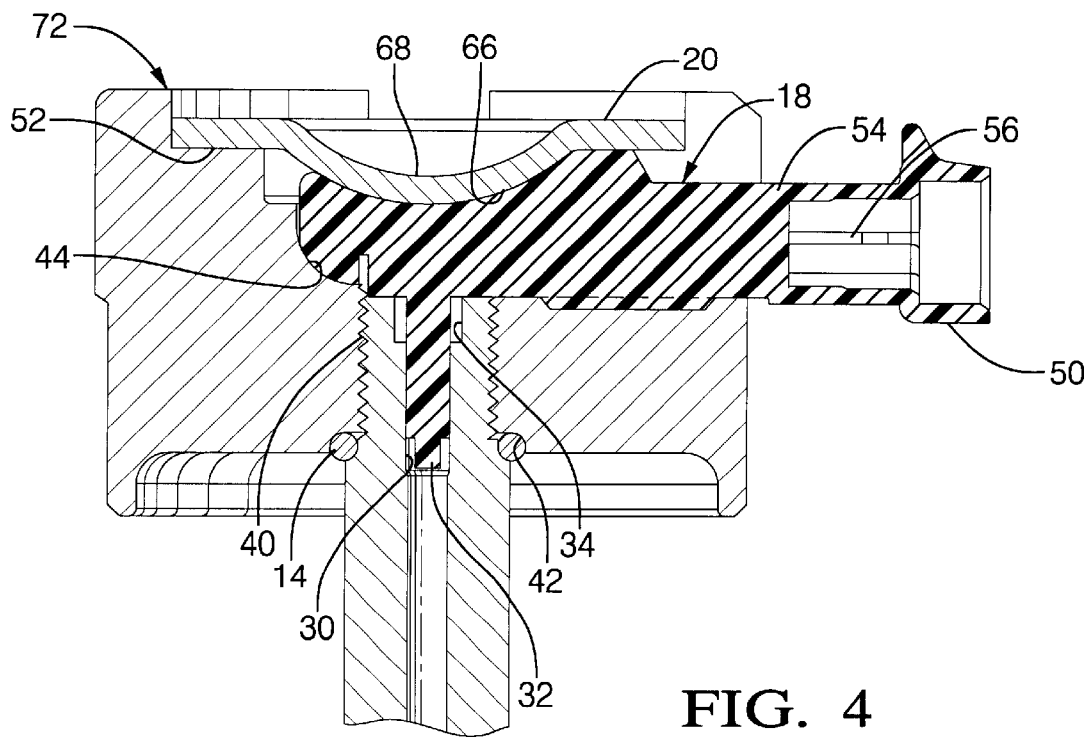
FIG. 4 is a cross-sectional view of the embodiment shown in FIG. 2 along lines 4—4.

Referring to FIGS. 1–4, one embodiment of a vehicle damper cup assembly of the present invention is shown generally at 10. As shown in FIG. 1, in the expanded or exploded view, the assembly 10 can generally include a piston rod 12, a wire-retaining ring 14, a base cup 16, an electrical connector 18 and a cap 20.

The piston rod 12 can be a slender cylindrical rod that extends in an axial direction. Adjacent a first end of the rod 12 a piston can be affixed in a known manner (not shown). Adjacent a second end 22, which is located at an end opposite the first end, is a threaded portion 24. Adjacent the threaded portion 24, a shoulder 26 can be formed. The shoulder 26 can be formed with a flare, land, concavity, or like configuration, to provide a seat or stop. The rod 12 can further include an axial bore or chamber 28. The chamber 28 can extend longitudinally along part or all of the rod length. The chamber 28 can be provided to house sensors or devices (not shown) for the purpose of sensing or effecting changes in the strut properties. Other devices can be positioned within the chamber 28. The rod chamber or bore 28 can include a first countersunk portion 30 (See FIG. 4) to allow insertion of a terminal portion 32 of the electrical connector 18. A second countersunk portion 34 can be formed in a relatively distal section of the bore with respect to the first countersunk portion 30. The second countersunk portion 34 can include a driving feature such as a "Torx" socket or hexagonal, or like, configuration or feature incorporated therein. In this manner, the rod 12 can be mechanically driven or rotated by engaging the second countersunk portion 34 with a mechanical device, such as, for example, an electrical motor with a male portion that cooperates with the second countersunk portion 34.

The wire retaining ring 14 can be a completely or partially closed ring made of steel or any suitable material. The ring 14 can be positioned on or contacted to the rod shoulder 26 to provide a positive stop feature between the rod 12 and base cup 16. In this manner, the rod 12 can be threaded a predetermined distance into the base cup 16 when the ring 14 contacts both the rod shoulder 2 and the base cup 16.

The base cup 16 can include a generally cylindrical body or overall shape. The base cup 16 can be made of any suitable material. In one embodiment, the base cup 16 is formed of a metal material. Casting, forging, stamping or any suitable process can be used to form the base cup 16. A first portion 36 of the base cup body 16 can be cylindrical for insertion into a cylindrical strut reservoir tube 70. The body of the base cup 16 can include a second collar portion 38 adjacent the first portion 36. The base cup first portion 36 can include a threaded axial bore or opening 40. In another embodiment, the threaded portion 40 can extend through the body 16 through both the first and second portions 36, 38.

The opening 40 can include an annular groove or portion 42 to contact the wire retaining ring 14. The axial thickness of the base cup 16 at the threaded opening 40 can be, for example, from about ¼ inches to about ¾ inches. It will be understood that the thickness of the base cup 16 can be a predetermined thickness that resists or reduces deflection or deformation of the cup member 16 and the overall assembly 10 from stresses or loads. In this manner, the base cup 16 resists fatigue failures related to loads placed on the base cup 16 and associated elements of the assembly 10.

The base cup body 16 can include a connector seat area 44, which can be formed in the second portion of the body 38. The connector seat area 44 can be a chamber or countersunk area formed adjacent and opening to the axial bore 40 and allows the connector 18 to be received therein. The connector seat area 44 can open or extend through a slot 46 formed through a sidewall portion of the second or collar portion 38 of the body 16 (so that a socket portion 50 of the electrical connector 18 extends out of the base cup body 16). A second countersunk area or cap seat area 52 can be formed outwardly from the connector seat area 44 to receive the cap 20 in the collar portion 38 of the body 16.

The electrical connector 18 can include a connector body portion 54. The connector body portion 54 can be formed of a non-metallic material, for example, plastic. The body 54, which can be of a generally elongate shape, can include a socket portion 50 adjacent one end of the body for receiving an electrical plug, jack, connector or the like (not shown). The socket portion 50 can include a pair of socket terminals 56. Opposite the socket portion 50 is an extending terminal portion 32 for electrically connecting one of the socket terminals 56 to an electrical component (not shown) in the rod 12. The other socket terminal can be electrically connected to a ground terminal 60 positioned along the connector body 54 (see FIG. 4). The ground terminal 60 is positioned along the connector body 54 to contact the base cup 16 when the two components 16, 18 are assembled. The terminal portion 32 can include a sheath 62. The sheath 62 surrounds the terminal portion 32 outside of the connector body 54 and can be made of a plastic material including electrical insulating properties. A gasket 64 can be positioned about the sheath 62 to form a seal between the base cup 16 and the connector body 54 when the two components are assembled. The gasket 64 can be made of any suitable gasket material, for example, silicone. The electrical connector 16 can include a concavity 66 for contacting a retaining surface 68 of the cap 20.

The cap 20 can be disc shaped and can be inserted into the cap seat area 52. The cap 20 can be provided with a central convex portion 68 that contacts the concavity 66 in the electrical connector body 54 to secure the connector 18 in place in the base cup 16. Any suitable means can be used to secure the cap 20 in the base cup 16. In one embodiment, the cap 20 can be secured in place by staking. Staking involves moving by deforming or displacing an adjacent portion 72 of the base cup 16 over the peripheral edge of the cap 20 after the cap 20 has been seated in the cap seat area 52.

The assembly of one embodiment of the present invention proceeds by securing the base cup 16 in the bottom of the strut (not shown). The base cup 16 can be secured by press fitting the cup 16 into the end of the reservoir tube 70 and welding the cup in place. The piston rod 12 can be provided with the wire retaining ring 14. The threading of the rod 12 can be initiated by hand into engagement with the threaded opening 40 of the base cup 16. In one embodiment, the assembly of the rod 12 to the base cup 16 includes starting the threaded end 24 of the rod 12 into the base cup 16 by hand. The completion of the coupling of the rod 12 to the base cup 16 can be performed by rotating the rod 12 mechanically through the engagement of a mechanical device in the rod-driving feature 34. If a wire retaining ring 14 is used, the assembly of the piston rod 12 to the base cup 16 seats the ring 14 to the rod shoulder 26 and the groove 42 of the base cup 16. This ensures the proper insertion depth of the rod 12 in the cup 16. The proper insertion depth ensures a proper connection between the rod 12 and the cup 16 and a proper connection between the terminal 32 of the electrical connector 18 and the electrical component (not shown) in the rod 12.

After assembly of the rod 12 and the cup 16, the electrical connector 18 can be inserted into the provided seat 44. Insertion of the terminal portion 32 allows electrical connection of the connector 18 terminals 56 with the electrical component in the rod 12. Also, the ground terminal 60 contacts the cup 16, providing means for a completed circuit. The cap 20 is fitted to the base cup 16 and secured in place, in one embodiment by a staking process. Briefly, in the present embodiment, staking involves contacting the body of the base cup 60 at a peripheral portion 72 adjacent the cap 20 such that body material is deformed over the cap 20, and thus holding the cap in place.

Figure 6:
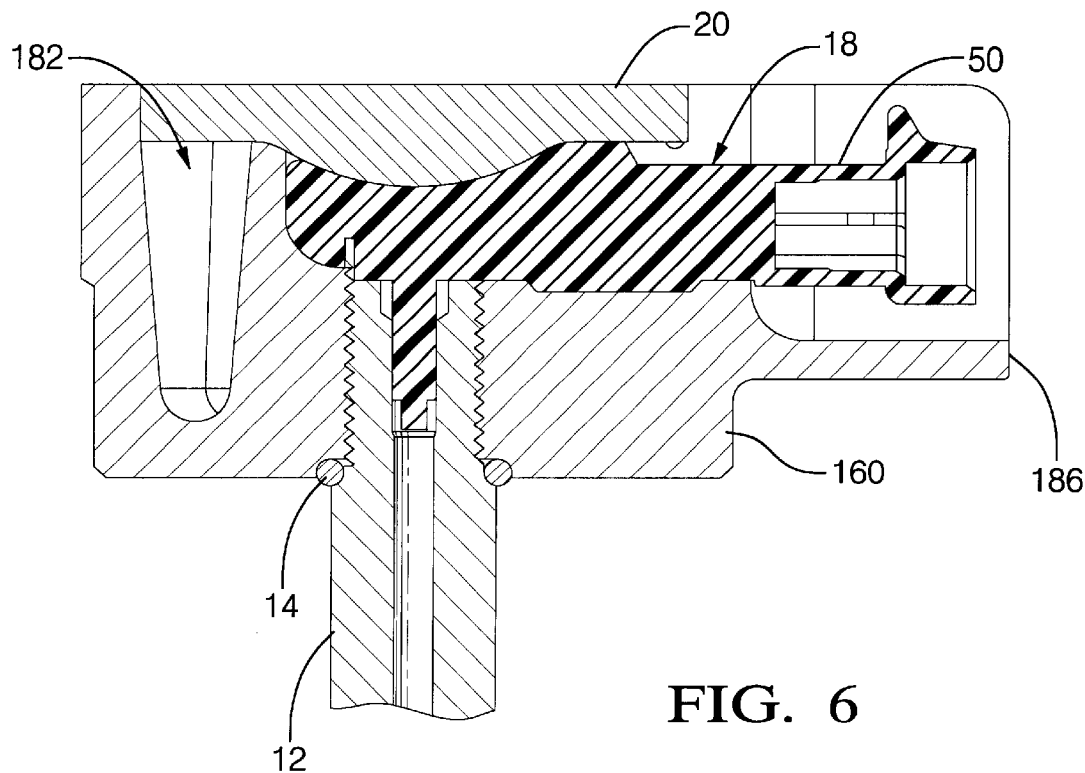
FIG. 6 is a cross-sectional view of the assembly shown in FIG. 5.
Figure 5:
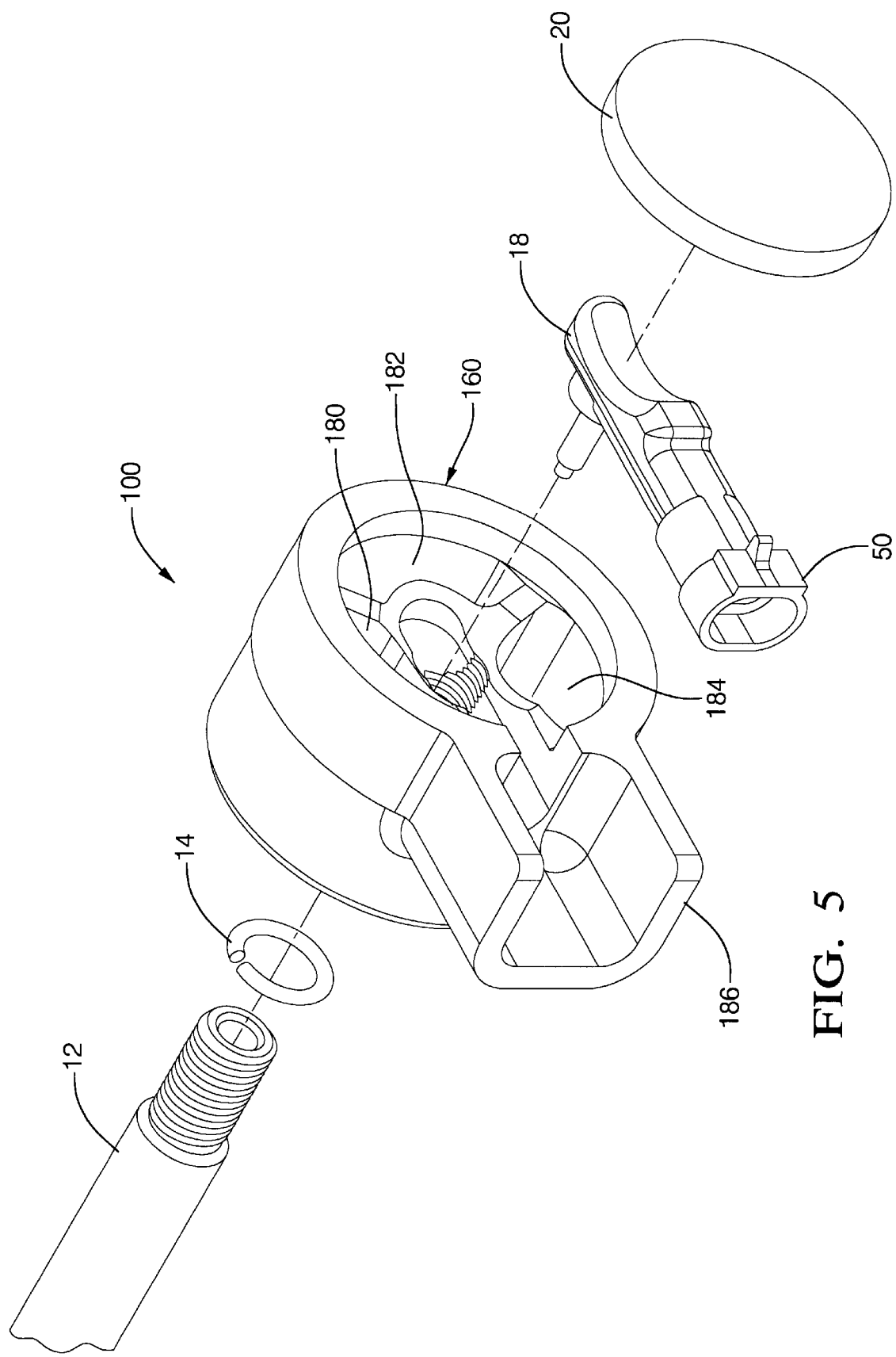
FIG. 5 is an exploded view of another embodiment of the base cup and rod assembly of the present invention.

Referring to FIGS. 5–6, another embodiment of a vehicle damper cup assembly of the present invention is shown generally at 100, where like elements are referred to with like reference characters. In this embodiment, the base cup 160 can include a body formed using powder metal, which can be fused or processed by sintering, or the like. Forming the body of powder metal can provide a less expensive and lighter weight base cup 160 that still retains the rigid properties desired.

The assembly 100 can generally include a piston rod 12, a wire-retaining ring 14, a base cup 160, an electrical connector 18 and a cap 20. The assembly 100 is arranged and fitted together in a fashion like that of the previous embodiment. However, the base cup 160 shown in FIGS. 5 and 6 can include features that differ from that of the previous embodiment. The base cup 160 can include a plurality of voids 180, 182, 184 formed therein for further reducing weight. In addition, the base cup 160 can include an extension or housing 186 for the socket portion 50 of the electrical connector 18, which in the illustrated embodiment includes a U-shaped radial extension of the base cup 160. The extension 186 can provide protection for the socket 50 and electrical connector 18 from damage and the like.

Figure 7:
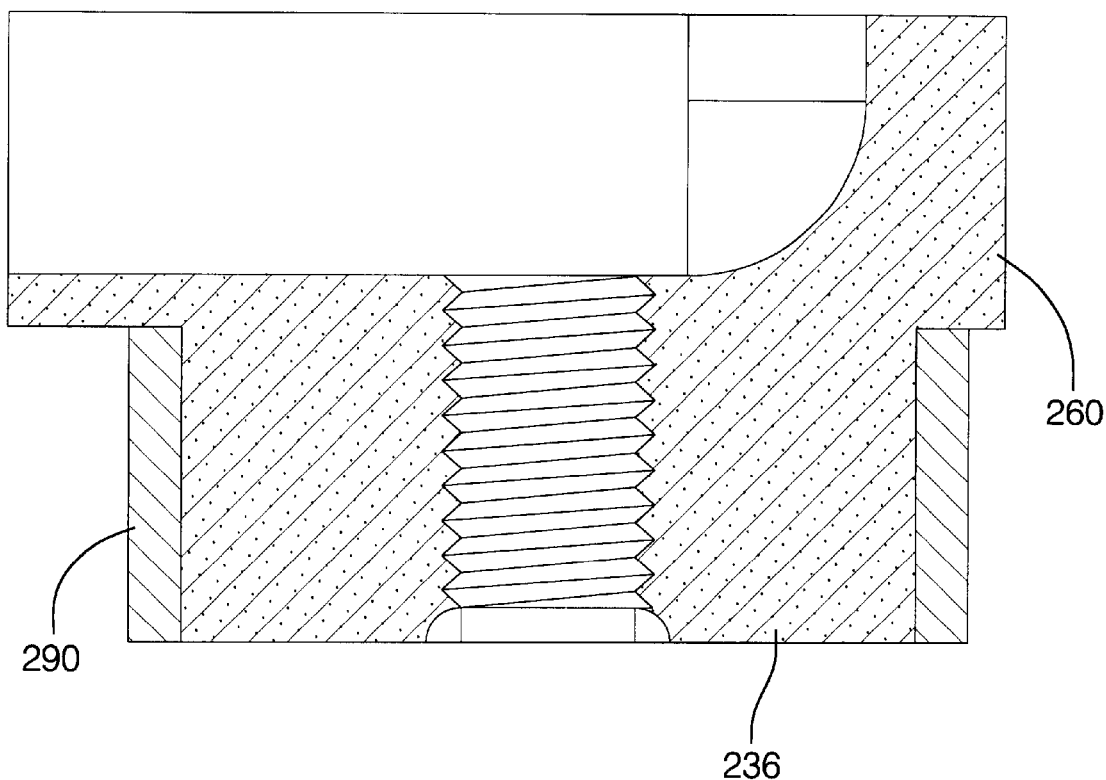
FIG. 7 is a cross-sectional view of another embodiment of the base cup of the present invention.

Referring to FIG. 7, another embodiment of a base cup of the present invention is shown generally at 260. In this embodiment, the base cup 260 can include a body formed of powder metal, which can be processed into a unitary element by processes known in the art. While similar to the base cup shown in FIGS. 5–6, the present base cup 260 can include a sleeve 290 of metal, for example, steel, provided about the periphery of the first portion 236. The sleeve 290 can be attached to the powder metal base cup by brazing or the like. In this manner, the sleeve 290 can provide a substrate suitable for welding into the reservoir tube (not shown).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A vehicle strut assembly having an electrical connector, the strut assembly comprising:
    a body including a cylindrical tube terminating at one end thereof in a base cup having a connector seat area for receipt of the connector, and also having a countersunk cap seat area outward from the connector seat area for receipt of a cap for closing the connector seat area; and
    a cap in the cap seat area closing the connector seat area.

2. The strut of claim 1 wherein the electrical connector includes a radially extending socket portion thereof and the connector seat area includes a radially extending slot opening outwardly from the base cup for receipt of the radially extending portion of the connector, the slot thereby allowing the connector to be mated with an electrical circuit at a point outside of the base cup.

3. The strut of claim 1 wherein the cap restrains the connector in the connector seat area.

4. The strut of claim 1 wherein the cap comprises a generally flat discoidal shape having an outer peripheral area adapted for contacting the cap seat area.

5. The strut of claim 1 wherein the cap is retained in the cap seat area by staking.

6. The strut of claim 1 further comprising:
    a piston rod extending axially into the cylindrical tube, the piston rod having a threaded end for securing the threaded end of the piston rod to the base cup; and
    wherein the base cup includes threaded receptacle for receipt and threaded engagement with the threaded end of the piston rod, the threaded receptacle extending through the base cup and opening into the connector seat area.

7. The strut of claim 6 wherein the electrical connector includes an axially extending terminal portion, and the threaded end of the piston rod further comprises a first countersunk portion extending axially into the piston rod from the threaded end for receipt of the terminal portion of the electrical connector.

8. The strut of claim 7 wherein the threaded end of the piston rod includes a second countersunk portion opening to the end of the piston rod, the second countersunk portion being adapted for receipt of and engagement with a tool for threading the piston rod into the base cup.

9. The strut of claim 6 further comprising a wire retaining ring at the juncture of the piston rod and the base cup, wherein:
    the threaded end of the piston rod includes a shoulder adapted to bear against the retaining ring; and
    the base cup includes an annular groove for receipt of the retaining ring.

10. The strut of claim 1 wherein the base cup includes a first portion adapted for insertion into the cylindrical tube, and a second collar portion extending beyond the cylindrical tube, the second collar portion having a larger diameter than the first portion such that a shoulder is formed at the juncture of the first portion and the collar portion for limiting the depth that the base cup is inserted in to the cylindrical tube.

11. The strut of claim 10 further comprising a ring disposed between the first portion of the base cup and the cylindrical tube.

12. The strut of claim 11 wherein the ring is comprised of a material different from at least one of the base cup and the cylindrical tube.

13. The strut of claim 1 wherein the base cup assembly includes cavities for reducing weight opening to the outer end of the base cup prior to installation of the cap and covered by the installed base cap.

14. The strut of claim 11 wherein the connector includes a ground terminal and the connector seat area includes a surface for contacting the ground terminal when the connector is installed in the base cup.

15. A method of assembling a vehicle strut assembly having an electrical connector, a body including a cylindrical tube terminating at one end thereof in a base cup having a connector seat area for receipt of the connector, the base cup also having a countersunk cap seat area outward from the connector seat area for receipt of a cap for closing the connector seat area, a cap in the cap seat area closing the connector seat area, a piston rod extending axially into the cylindrical tube, the piston rod having a threaded end for securing the threaded end of the piston rod to the base cup, the base cup including a threaded receptacle for receipt and threaded engagement with the threaded end of the piston rod, the threaded receptacle extending through the base cup and opening into the connector seat area, the threaded end of the piston rod including a countersunk portion adapted for receipt of and engagement with a tool for threading the piston rod into the base cup, the method comprising:

threading the threaded end of the piston rod partially into the threaded receptacle;

inserting a tool through the base cup and into engagement with the countersunk portion of the piston rod; and rotating the tool for completing threaded engagement of the rod into the base cup.

16. The method of claim 15 further comprising installing the electrical connector in the connector seat area after completing full threaded engagement of the piston rod with the base cup.

17. The method of claim 16 further comprising installing the cap in the cap seat area after installation of the electrical connector.

* * * * *